(12) United States Patent
Westlund et al.

(10) Patent No.: US 8,280,245 B2
(45) Date of Patent: Oct. 2, 2012

(54) OPTICAL SAMPLING WITH COHERENT DETECTION

(75) Inventors: Mathias Westlund, Lerum (SE); Mats Sköld, Gothenburg (SE); Henrik Sunnerud, Landvetter (SE); Peter A. Andrekson, Billdal (SE)

(73) Assignee: EXFO. Inc., Quebec (CA)

( * ) Notice: Subject to any disclaimer, the term of this patent is extended or adjusted under 35 U.S.C. 154(b) by 340 days.

(21) Appl. No.: 12/710,683

(22) Filed: Feb. 23, 2010

(65) Prior Publication Data

US 2010/0215357 A1 Aug. 26, 2010

Related U.S. Application Data

(60) Provisional application No. 61/208,418, filed on Feb. 23, 2009.

(51) Int. Cl.
*H04B 10/08* (2006.01)
*H04B 17/00* (2006.01)
(52) U.S. Cl. .................................................... 398/16
(58) Field of Classification Search ............... 398/205
See application file for complete search history.

(56) References Cited

U.S. PATENT DOCUMENTS

| | | | | |
|---|---|---|---|---|
| 7,042,629 B2* | 5/2006 | Doerr et al. | ................ | 359/325 |
| 7,133,135 B2* | 11/2006 | Dorrer | ................ | 356/450 |
| 7,298,489 B2* | 11/2007 | Dorrer | ................ | 356/450 |
| 2004/0114939 A1* | 6/2004 | Taylor | ................ | 398/152 |
| 2006/0245766 A1* | 11/2006 | Taylor | ................ | 398/208 |
| 2007/0041728 A1* | 2/2007 | Dorrer | ................ | 398/16 |
| 2009/0047030 A1* | 2/2009 | Hoshida | ................ | 398/205 |
| 2011/0019994 A1* | 1/2011 | Frisken | ................ | 398/16 |

FOREIGN PATENT DOCUMENTS

WO WO 2004/054138 6/2004

* cited by examiner

*Primary Examiner* — Kenneth N Vanderpuye
*Assistant Examiner* — Abbas H Alagheband

(57) ABSTRACT

An optical sampling arrangement for high-speed measurement of the time-varying electric field of a data-carrying optical input signal. The present invention includes optical sampling of the optical input signal, followed by coherent mixing with a reference laser source in an optical hybrid solution. The generated streams of mixed optical samples are then detected and signal processed in order to reconstruct a sampled version of the electric field of the data-carrying optical input signal.

19 Claims, 9 Drawing Sheets

OPTICAL SAMPLING WITH COHERENT DETECTION

CROSS-REFERENCE TO RELATED APPLICATIONS

This application claims the benefit of U.S. Provisional Application 61/208,418 filed Feb. 23, 2009 and herein incorporated by reference.

TECHNICAL FIELD

The present invention relates to an optical sampling technique for characterizing optical signals, and, more particularly, to a high bandwidth, phase sensitive sampling technique accomplished by coherently mixing optical samples from a high-speed optical gate with a local oscillator, followed by digital signal processing of the collected samples to visualize the original signal.

BACKGROUND OF THE INVENTION

The recent advances in the field of optical communication with new, more complex, data modulation formats as a key technology has created a need for optical waveform characterization tools that are capable of extracting more information from the waveform than simply its power as a function of time. Encoding data onto the optical carrier by modulation of the optical-field phase and the optical-field amplitude becomes increasingly attractive and seems to be a technology that will contribute to increase the capacity of future fiber optic communication links. However, measurement of the complete electrical field of the optical signal, which is required to visualize both its phase and amplitude information, requires coherent detection techniques that utilize a reference phase at the measurement point, for example a continuous wave (CW) laser emitting local oscillator light source (LO). The mixing of the input optical signal with a reference optical signal (LO) will open up the possibility of measuring the time-varying phase changes of the input optical signal relative to the LO signal.

Coherent detection is not a novel technology. In fact, it was extensively studied during the 1980's and the technology was proposed as a solution for high-sensitivity signal detection. However, implementation was difficult and with the advent of Erbium-doped fiber amplifiers (EDFA), the commercial deployment of coherent systems has been delayed. Nevertheless, research has continued in the field and the basic understanding of coherent detection systems has been summarized in references such as "Fiber-optic communication systems" by G. P. Agrawal (Wiley, $3^{rd}$ ed., 2002). Recently, coherent detection approaches have attracted renewed interest, driven by the need for more spectrally-efficient modulation formats, as well as the availability of high-speed electronic processing for post-compensation of transmission-created impairments.

The transition towards novel advanced modulation formats for optical communication that incorporate modulation of both amplitude and phase has created a need for new measurement technologies that are capable of measuring the time-dependent electrical field of the optical signal under test. For high-speed optical data signals, the measurement system also requires a high measurement bandwidth for accurate reconstruction of the optical signal under test. Digital sampling is a technology that can provide enough measurement bandwidth for the high-speed optical signals, and can be used in conjunction with coherent detection to provide high-speed electrical field measurements of the optical signal under test.

Digital sampling is a technique used to visualize a time-varying waveform by capturing quasi-instantaneous snapshots of the waveform via, for example, a sampling gate. The gate is "opened" and "closed" by narrow pulses (strobes) in a pulse train that exhibit a well-defined repetitive behavior such that ultimately all parts of the waveform are sampled. The sampling implementation can either be real-time or equivalent-time, where real-time sampling refers to the case where the sampling rate is higher than twice the highest frequency content of the waveform-under-test (Nyquist sampling), while equivalent-time sampling uses an arbitrarily low sampling rate. However, equivalent-time sampling requires the measured waveform to be repetitive (in order to provide accurate signal reconstruction)—a fundamental limitation when compared to real-time sampling.

The prior art includes several implementations that facilitate coherent measurement of the electrical field of an optical input signal carrying optically-encoded data by utilizing digital sampling, coherent mixing with a reference signal and subsequent signal processing for signal reconstruction and visualization. Representative prior art solutions will be outlined here, with particular limitations identified that are addressed by the present invention.

FIG. 1 shows a prior art arrangement for measurement of the electrical field of an optical input signal S. As shown, optical input signal S and a reference local oscillator optical signal LO from a laser source 14 are applied as separate inputs to a 90° optical hybrid 16. Optical hybrid 16 mixes optical input signal S with the four quadrature states associated with reference signal LO in the complex-field space. The operation of optical hybrid 16 therefore generates a set of four mixed fields, representing the complex field sums S+LO, S−LO, S+jLO and S−jLO, as shown.

Thereafter, the, pair of field sums S+LO and S−LO as applied as inputs to a first balanced detector 18, which will generate an electrical signal output representative of the difference between the two signals. Similarly, the pair of field sums S+jLO and S−jLO are applied as inputs to a second balanced detector 20. By square law detection of the four fields in balanced detectors 18 and 20, the two output detector signals (electrical currents) are expressed as:

$$I_1(t)=4|S(t)||LO|\cos(\omega_{IF}t+\phi_S(t)+\phi_{LO,1}), \text{ and}$$

$$I_2(t)=4|S(t)||LO|\cos(\omega_{IF}t+\phi_S(t)+\phi_{LO,2}),$$

where the intermediate frequency IF related term $\omega_{IF}$ is defined as $\omega_S-\omega_{LO}$, which is the angular frequency difference between the signal field and the LO field. The term $\phi_S(t)$ represents the time-varying phase of optical input signal S, and the quantity $(\phi_{LO,1}-\phi_{LO,2})$ represents the relative phase shift of the optical reference signal LO between the hybrid outputs. Advantageously, this induced relative phase shift will be selected to be $\pi/2$ for an optical hybrid such as optical hybrid 16 (thus termed as a "90° optical hybrid"), although in general other phase shifts may be employed, provided that they are not integral multiples of $\pi$.

The output currents from balanced detectors 18 and 20 are then amplified by amplifiers 22 and 24 before being digitally sampled in analog-to-digital (A/D) converters 26 and 28. Finally, the acquired batches of samples from $I_1(t)$ and $I_2(t)$ are applied as inputs to a signal processor 30 in order to recover a visualization of the electrical field of optical input signal S. Inasmuch as the arrangement of FIG. 1 uses two separate laser sources for optical input signal S and reference signal LO, the intermediate frequency will be non-zero (i.e., $\omega_{IF}\neq 0$). As a result, the value of the IF needs to be calculated in order to extract $\phi_S(t)$, which represents the phase modulation of interest of the signal. There are several algorithms available for extracting $\omega_{IF}$ in the prior art, see, for example, US Published Application 2006/0245766, authored by M. G. Taylor and published on Nov. 2, 2006. With the IF recovered, it is straightforward to then extract both amplitude and phase information for optical input signal S and visualize the measured signal as, for example, a constellation diagram.

This prior art coherent detection technique as shown in FIG. 1 requires the use of electronic sampling technology (A/D converters 26, 28) and thus has at least one significant drawback associated with the bandwidth limitation of the electronic A/D converter and digital sampling circuits. The highest available analog bandwidth in high-speed A/D converters is today typically <20 GHz and hence the maximum measurable signal "baud" (i.e. symbol rate) is generally less than 30 GBaud.

In contrast to electrical sampling, optical sampling is a proven technology that can provide extremely high bandwidth. Traditionally, optical sampling has been used to measure the time-varying optical power of an optical input signal with very high temporal resolution, but very few optical-sampling implementations are capable of measuring the complete electrical field of an optical signal.

FIG. 2 shows an exemplary prior-art arrangement for a coherent detection linear optical sampling system that is capable of measuring the complete electrical field of the optical input signal. In this case, optical input signal S is mixed in an optical hybrid 36 with coherent light serving as a reference local oscillator (LO) signal originating from a pulsed sampling laser source 34. The main difference between the prior art linear sampling system in FIG. 2 and the electronic sampling system in FIG. 1 is the utilization of "pulsed" reference LO signal in the arrangement of FIG. 2. In contrast, a continuous wave (CW) source 14 is used in the prior-art arrangement of FIG. 1. The use of a pulsed sampling laser provides a fast gating functionality that is independent of the limited bandwidth of an A/D converter. By reducing the optical-sampling rate to well below the analog bandwidth of the A/D converter, the measurement bandwidth of the system will be dictated only by the temporal resolution of the optical-sampling gate (roughly the pulse width of the pulsed source 34).

As before, the four output mixed electric-field signals from optical hybrid 36 are applied as inputs to a pair of balanced detectors 40 and 42. The detector currents are then amplified by amplifiers 44 and 46 and applied as separate inputs to an A/D converter 38. In this prior-art linear sampling system, A/D converter 38 needs to operate at the same sampling rate as the pulse rate of the sampling laser 34. To accomplish this, a photodetector 48 and a pulser circuit 50 are coupled between sampling laser source 34 and A/D converter 38 and are used to create a clock signal that synchronizes the sampling rate of sampling laser 34 with the sampling rate of A/D converter 38. With acquired batches of samples of the photodetector currents from A/D converter 38, the required signal processing needed in order to reconstruct the original waveform is similar to that described for the electrical sampling case in FIG. 1 and is not explicitly illustrated in FIG. 2.

There remain, however, a few drawbacks with this hardware implementation, particularly related to strict wavelength requirements on the sampling pulse laser. That is, the linear optical sampling technology requires the sampling pulse spectra to overlap the optical signal spectra in order to provide distortion-free gating and coherent mixing using the same laser source. These requirements complicate the possibility of providing an optically broadband measurement system, since if the wavelength of the optical input signal is changed, the pulsed sampling laser must also adapt its wavelength (as well as adapt the required spectral shaping filter 52). Another parameter which can be challenging is the fact that the pulse-to-pulse phase change of sampling laser 34 must be small, hence a high coherence pulsed laser is required.

Thus, a need remains in the art for an arrangement capable of characterizing (visualizing) the complete electrical field of high-symbol-rate optical signals without being hampered by limited electrical measurement bandwidth or by the need for unnecessarily complicated optical-sampling pulse sources.

SUMMARY OF THE INVENTION

The needs remaining in the prior art are addressed by the present invention, which relates to a high bandwidth optical-sampling technique with high bandwidth for systems employing advanced modulation formats and, more particularly, to a phase-sensitive sampling method accomplished by coherently mixing optical samples from a high-speed optical gate with a separate local oscillator, followed by digital signal processing of the collected samples (particularly well-suited for measurement of the electrical field of optical signals).

In accordance with the present invention, an optical input signal S is first optically sampled using an optical sampling gate, where the phase characteristics of the resulting gated signal are substantially the same as optical input signal S.

To recover and visualize the electric field of optical input signal S, the generated optical samples are thereafter coherently mixed with a CW local oscillator (LO) signal (from a separate laser source) in a 90° optical hybrid (or other suitable phase-diverse mixing element). The output fields from the 90° optical hybrid are then detected by balanced detectors and the generated photodetector currents digitized using analog-to-digital converters (ADCs) sampling synchronously with the sampling pulse source. Finally, the collected batches of samples are signal processed to remove the intermediate frequency components associated with the mixed optical fields and extract the time varying amplitude and phase of the original optical input signal-under-test.

The described nonlinear optical sampling arrangement of a preferred embodiment of the present invention thus provides high temporal resolution sampling of the complete electrical field of an optical data signal.

The present invention has at least one advantage over the prior-art linear sampling arrangement in that the sampling pulse source and the LO source of the present invention comprise two separate and independent optical sources. As a result, the wavelength of optical input signal S can be tuned without requiring the sampling pulse source wavelength to change likewise; only the CW LO source is required to track the wavelength of the generated optical samples in order to obtain a suitable IF. Tuning a CW LO source (e.g., a single-frequency laser) is considered to be less difficult than attempting to adjust the wavelength of a highly coherent pulsed sampling source.

In alternative embodiments of the present invention, polarization-independent and polarization-diversity phase-sensitive optical sampling can be realized. In these embodiments, a polarization-independent nonlinear optical sampling gate is utilized in combination with either a polarization-diversity optical-hybrid arrangement or a polarization-independent optical-hybrid arrangement. Further details will become apparent during the course of the following discussion and by reference to the accompanying drawings.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
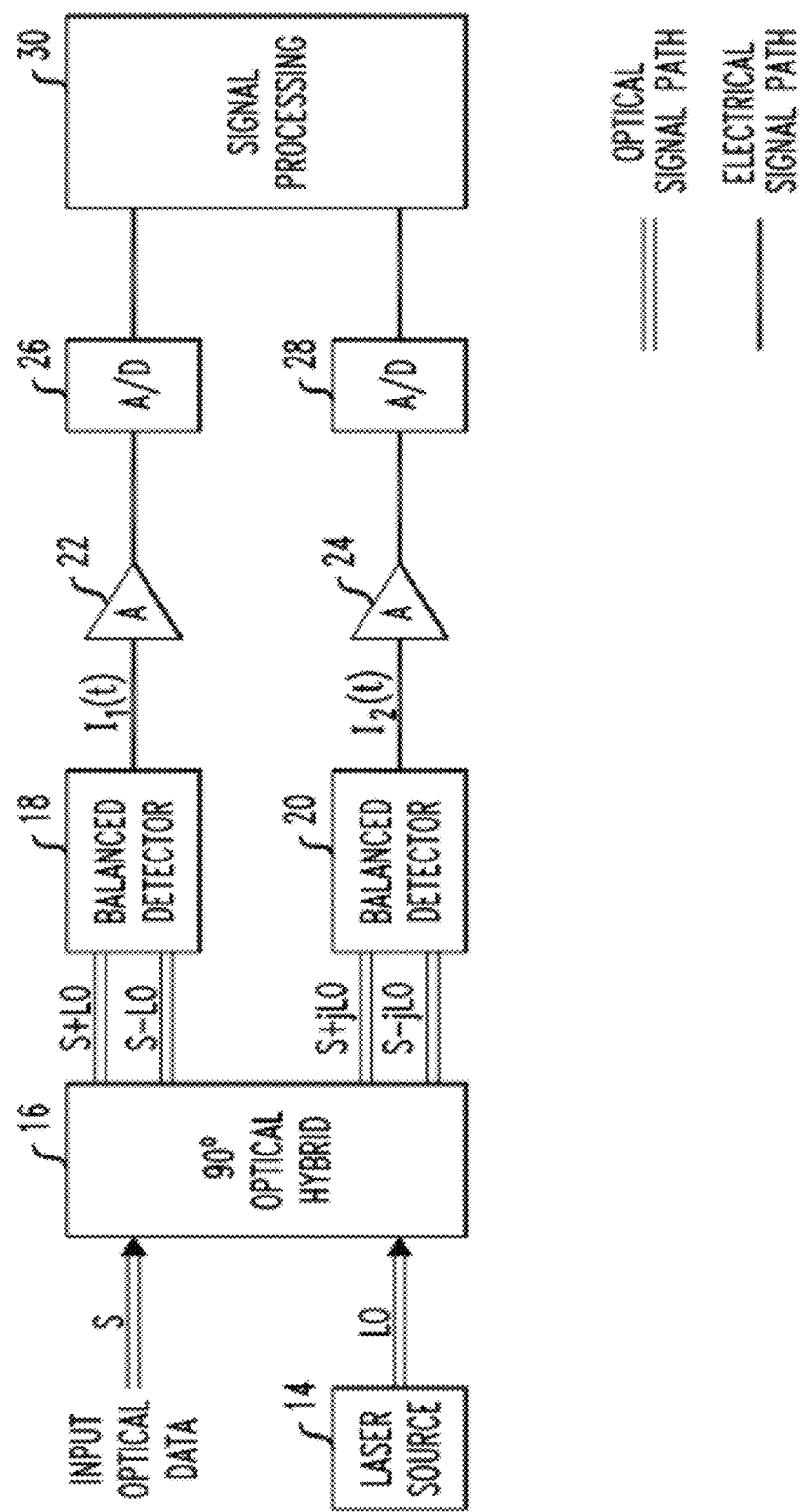
FIG. 1 illustrates a prior art coherent detection arrangement for electrical sampling detection of both the amplitude and phase of time varying optical signals.
Figure 2:
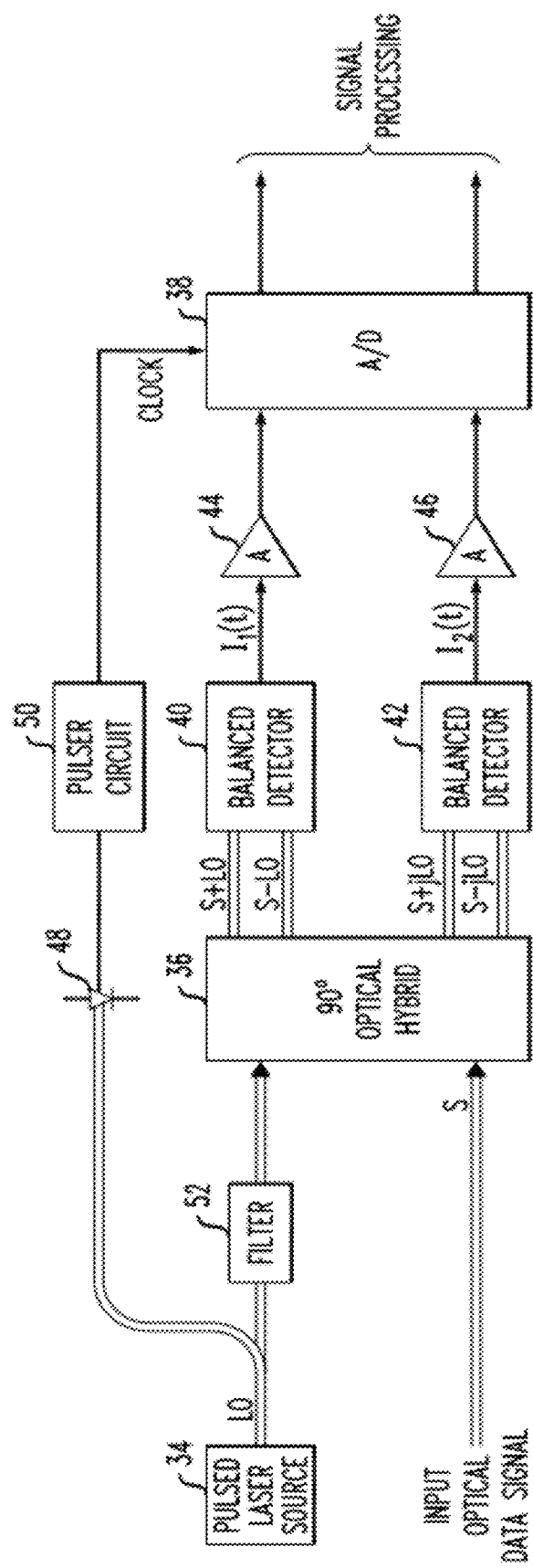
FIG. 2 illustrates a prior art arrangement for linear sampling.
Figure 3:
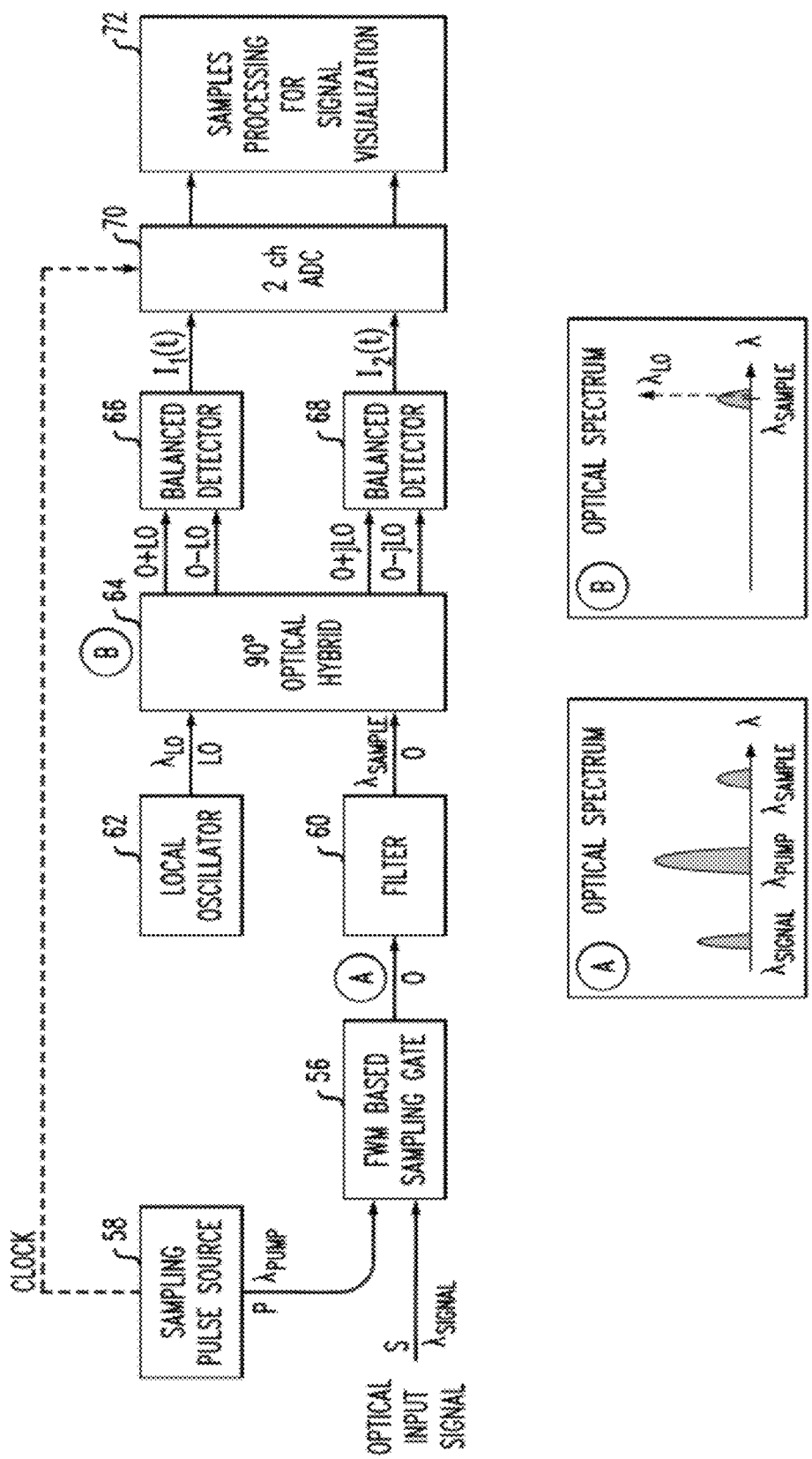
FIG. 3 shows an embodiment of the present invention for a four-wave mixing (FWM) based optical sampling gate used to sample the signal before coherent mixing of the optical samples with a CW LO laser in a 90-degree optical hybrid. The detected samples are then signal processed to visualize the input signal.

A first preferred embodiment of the present invention is illustrated in FIG. 3. As shown, an optical input signal S is first optically sampled by a nonlinear sampling process performed by a sampling gate 56. In one embodiment, the use of a "nonlinear" sampling process in accordance with the present invention has been found to provide the desired high speed temporal resolution; however, the subject matter of the present invention is not so limited. As shown in FIG. 3, a sampling pulse source 58 provides a high-power optical pulse train input P, at a known repetition rate $f_s$, to optical sampling gate 56. The stream of optical sampling pulses P will interact with the electrical field of optical input signal S in a sampling process in the sampling gate 56 and thus generate optically-sampled versions O of the optical data signal field at the output of sampling gate 56. The sampled version O is generated at a new wavelength $\lambda_{sample}$ separated from the wavelengths, $\lambda_{signal}$ and $\lambda_{pump}$, of both optical input signal S and sampling pulses P, respectively, as shown in diagram A of FIG. 3. Hence, the generated streams of optical samples O can be extracted by the use of, for example, an optical passband filter (e.g., a 2 nm optical filter), shown as optical filter 60 in FIG. 3. That is, filter 60 is selected to allow only the signal at wavelength $\lambda_{sample}$ (also often referred to as the "idler" wavelength) to continue to propagate through the system.

It should be appreciated that for a sampling process in accordance with preferred embodiments of the present invention, the SOP of optical input signal S and optical sampling pulses P are preferably aligned at the input of sampling gate 56. The degree of alignment may be adjusted by using a polarization controller (not shown) on optical data signal S (or sampling pulse train P) before it enters sampling gate 56. Indeed, there are embodiments utilizing, for example, certain nonlinear crystals, where optical input S and optical sampling pulses P are orthogonally mixed for maximum efficiency.

It should also be noted that sampling gate 56 need not be based on a four-wave mixing process or other nonlinear process. In addition, the strobe pulses emitted by sampling pulse source 58 need not necessarily be optical. For instance, the sampling gate 56 might be an electro-absorption modulator and the "strobe pulse" from source 58 might be a very fast electrical pulse. Alternatively, sampling gate 56 might be based on a saturable-absorption process, triggered by an optical strobe pulse. In either of these alternative approaches, as well as in other approaches that may be envisaged, the sampled output pulse train will have the same wavelength as the input pulse, unlike the FWM approach, where the output pulse is in general at a different ("idler") wavelength.

Additionally, it should be noted that optical pulse train P need not comprise pulses having a constant temporal spacing, i.e. characterized by a single repetition rate $f_s$, but may include any known repetitive pattern. It will be apparent to a person skilled in the art how the invention can be modified for such a case.

Optical sampling technologies can provide extremely high bandwidth measurement capability (bandwidths greater than 500 GHz have been demonstrated) and can be implemented using a large variety of optical phenomena and hardware arrangements. However, key to the present invention is that, in addition to enabling high measurement bandwidth, the sampling technique used for optical gating within sampling gate 56 preserves the phase of optical input signal S throughout the sampling process. This preservation allows for the possibility to recover the complete electrical field of optical input signal S.

One preferred embodiment of a nonlinear sampling gate 56 uses four wave mixing (FWM) between optical sampling pulse train P and optical input signal S. FWM can be performed in optical fibers exhibiting nonlinear characteristics (such as, for example, highly nonlinear optical fiber (HNLF)). In a properly-designed FWM sampling gate formed of HNLF, the conversion efficiency ($\eta$) of the power transferred from optical input signal S to the generated output field of samples O can be expressed as follows:

$$\eta = (\gamma P_p L)^2,$$

where $\gamma$ is defined as the nonlinear coefficient of the HNLF, $P_p$ is the peak power of pulse train P and L is the length of the HNLF segment. Indeed, large conversion efficiency is typically advantageous and in a FWM sampling gate an efficiency greater than 100% (i.e., 'gain') can be achieved.

The FWM process requires optical phase matching for efficient nonlinear interaction and, as a result, the generated output field of samples has a phase that is directly dictated by the phases of optical input signal S and the field of optical sampling pulses P. In fact, in the case of sampling pulses with high pulse-to-pulse phase correlation, the optical phase variation of the output optical pulse samples O generated in nonlinear sampling gate 56 can be considered to be directly representative of the phase variations of optical input signal S.

As shown in FIG. 3, the generated optical pulse samples O and a CW reference signal LO from a CW laser source 62 are coherently combined in an optical mixing element, preferably an optical hybrid, such as the illustrated optical hybrid 64. The wavelength of reference signal LO from laser source 62, denoted $\lambda_{LO}$, is chosen to overlap the wavelength of the samples ($\lambda_{samples}$) generated in the sampling process, where diagram B in FIG. 3 illustrates this overlap. It is to be noted that a significant aspect of the present invention, when compared to prior art configurations, is this use of a separate reference source, independent of the sample pulse source. By using two separate, independent optical sources to create the LO reference and the sampled input, the wavelength of optical input signal S can be readily tuned without requiring the sampling pulse source wavelength of sampling pulse source 58 to be changed as well.

As described above in association with the prior art, optical hybrid 64 functions to split and thereafter combine the two separate input signals, optical pulse samples O and CW reference signal LO, forming a set of four separate optical output signals, each signal coupled into a separate output signal path. In accordance with the operation of optical hybrid 64, each optical output signal will exhibit different relative phase shift between the optical pulse samples O and the electric field of reference signal LO.

Ideally, the relative phase shift of the four output ports of the optical hybrid 64 differs by 90° or equally π/2 radians (90° optical hybrid) yielding four output mixed fields represented by the complex field sums O+LO, O−LO, O+jLO and O−jLO. It is to be understood that there are other appropriate choices of relative delays between optical samples O and the field of CW reference signal LO and that the subject matter of the present invention is not limited to using only a 90° optical hybrid.

Moreover, optical hybrid 64 can be implemented in many different ways. For example, the signal combining and splitting properties of the hybrid may be provided by an all-fiber arrangement, planar waveguide technologies, or free-space bulk optics, or a combination thereof. It is to be understood that the present invention is independent of the choice of implementation of optical hybrid 64.

After coherent mixing of the optical samples O and CW reference signal LO, the four output complex field sums from 90° optical hybrid 64 are then applied as inputs to a pair of balanced detectors 66 and 68, where the samples originating from O+LO and O−LO are provided as separate inputs to balanced detector 66 and the samples originating from O+jLO and O−jLO are provided as separate inputs to balanced detector 68.

The square-law balanced detection of mixed samples O with reference signal LO results in that only the mixing terms between O and LO will be generated as electrical output signals $i_1(t)$ and $i_2(t)$ from balanced detectors 66 and 68, respectively. The non-mixed terms are cancelled by subtraction in the balanced detection process. After the balanced detection process, the electrical signals are thereafter applied as inputs to a pair of amplifiers (not shown) before being individually digitized in an analog-to-digital converter (ADC) 70.

In accordance with the present invention, the sampling rate in ADC 70 must be the same as (or a sub-multiple of) the optical sampling rate determined by the repetition rate $f_s$ of sampling pulse source 58. Also, the time delay of the sampling process must be adjusted in order to sample each incoming electrical signal sample close to its peak value. Furthermore, the analog bandwidth of ADC 70 needs to be large enough so as to separate each electrical signal sample value, hence on the order of the optical sampling rate $f_s$, (which may still be dramatically lower than the bandwidth of the input optical signal S).

In one embodiment of the present invention, only two of the outputs from optical hybrid 64, e.g. O+LO and O+jLO, are required to be detected (i.e., single-ended detection). In this case, however, the non-mixing terms of the complex field sums will remain at the output of the detectors. Hence, a higher LO-to-O ratio is required (compared to the balanced detection case) for correct measurements. Alternatively, and as discussed below, all four of the outputs may be detected in a balanced detector arrangement where the non-mixing terms will drop out.

After digitizing the detected signal in ADC 70, the two streams of electrical signal samples are signal processed in order to remove the influence of the intermediate frequency (IF) between the generated samples of optical input signal S and CW reference signal LO and recover the time-varying electrical field amplitude and phase of optical input signal S. The relative phase can be divided into a "slow", time-varying intermediate frequency (IF) part and a "fast" time varying phase part, originating from the data modulation of optical input signal S. The IF part stems from the instant frequency offset between the optical carriers of samples O and CW reference signal LO, and is removed by a signal processing algorithm implemented in signal processor 72 in order to extract the optical signal phase modulation of interest. Several signaling processing algorithms suitable for IF recovery are known in the art (see, for example, US Patent Publication 2006/0245766) and it is to be understood that the present invention is not limited to any specific signal processing implementation.

In an alternative arrangement of the embodiment of FIG. 3, the pair of balanced detectors 66 and 68 can be replaced by a set of four separate detectors, followed by amplification and individual analog-to-digital conversion of the four detected streams of samples. The balanced detection process may be emulated within signal processor 72 to produce the same functionality as when using balanced detectors.

The present invention generates sampled information about the amplitude and phase of the optical signals electric field as a function of time. As a result, the present invention provides the possibility to visualize the measured signal in great detail in a variety of ways. For example, the field of optical input signal S can be visualized in the complex plane as a constellation diagram, showing the superimposed optical field vectors (phasors) of the measured signal. FIGS. 4(a) and 5(a) illustrate constellation diagrams (625 k samples asynchronously sampled with 4.5 ps pulses at $f_s$=1.5625 GHz) with black samples representing the center of the bit-slot (20%) and the lines representing the noise-averaged signal field. FIG. 4(a) is associated with the measurement of a 10 GBaud QPSK signal and FIG. 5(a) is associated with the measurement of a 40 GBaud BPSK signal. The asynchronous sampling technique of the present invention also yields information about the signal data transitions (gray samples in the constellation diagrams).

Constellation diagrams, however, only show amplitude and phase information without time information. In contrast, the present invention also provides timing information for each measured sample and, as a result, visualization of phase, amplitude or optical power in an eye-diagram (or data pattern form, for repetitive data modulated on optical input signal S) is also possible. It is to be understood that the present invention is independent of the choice of visualization mode of the measured electric field of optical input signal S.

FIGS. 4(b) and 5(b) show the optical phase of the signal patterns ($2^7$-1 bits) in a visualized form, with FIGS. 4(c) and 5(c) illustrating a portion of the phase patterns in greater detail, where the high temporal resolution of the measurement enables accurate measurement of the rapid phase transitions. FIGS. 4(d) and 5(d) show the eye-diagram of optical input signal S power for the 10 GBaud QPSK signal and 40 GBaud BPSK signals, respectively.

Figure 4:
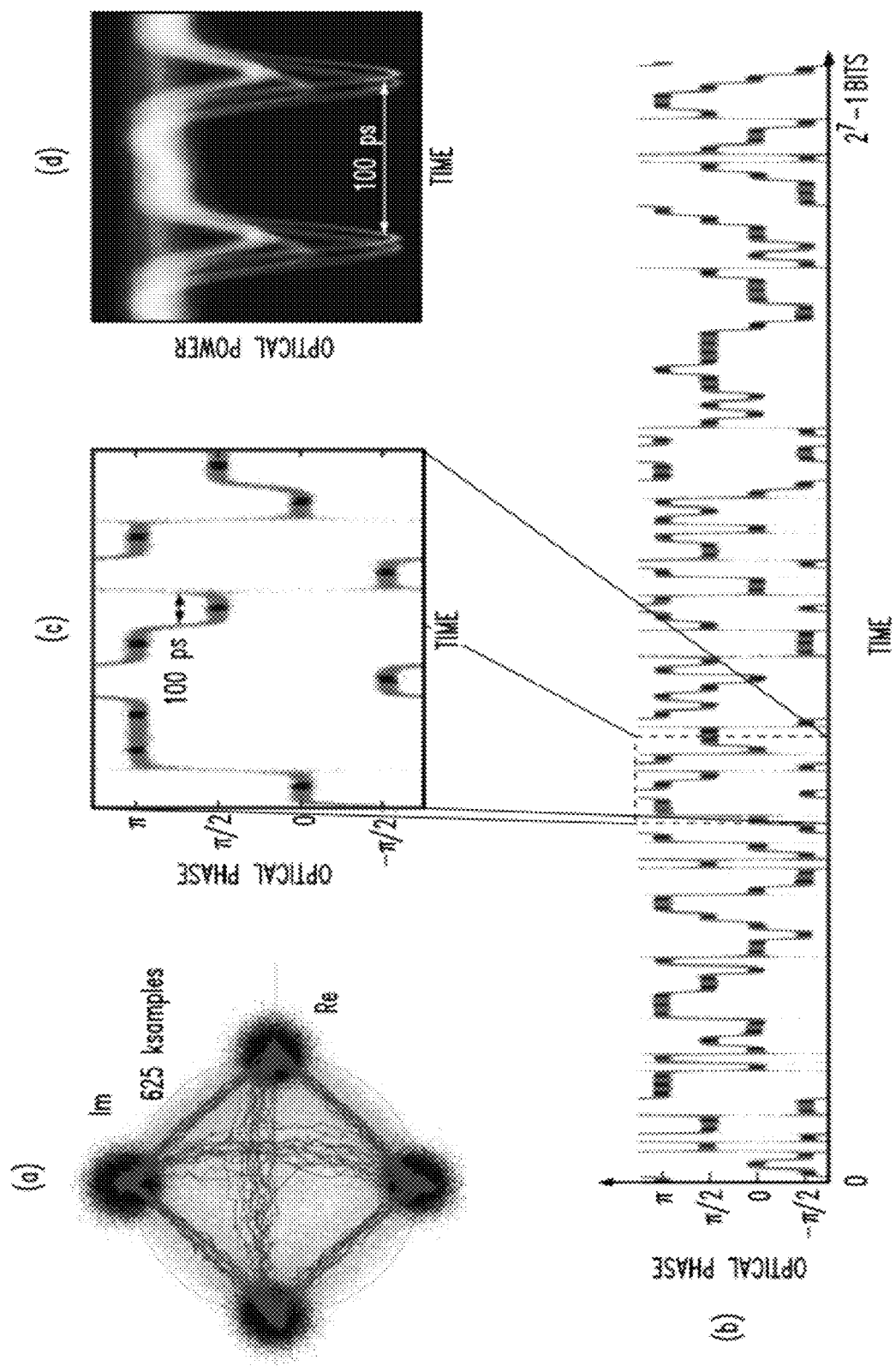
FIG. 4 shows the results of measurements on a 10 GBaud QPSK signal using the embodiment of the present invention as shown in FIG. 3.
Figure 5:
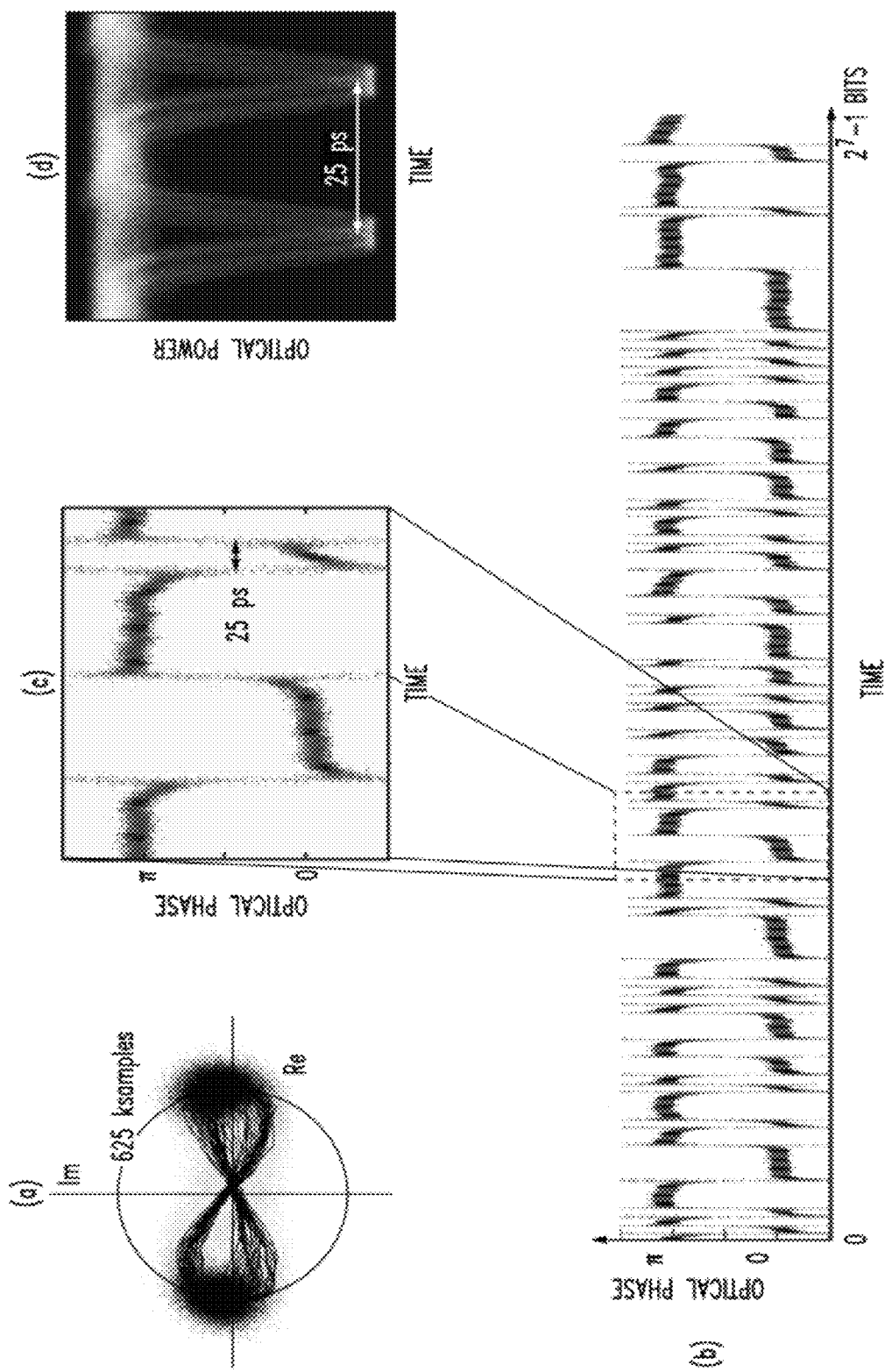
FIG. 5 shows the results of measurements on a 40 GBaud BPSK signal using the embodiment of the present invention as shown in FIG. 3.

While the diagrams of FIGS. 4 and 5 are associated with B/QPSK, it is to be understood that the principles of the present invention are equally applicable to other modulation formats, including but not limited to APSK and QAM.

For the embodiment illustrated in FIG. 3, the preferred implementation involves the use of optical fiber-based components. However the present invention can also be implemented using free-space optics in bulk optical components, monolithic waveguide optical components or a mix of different types of free-space and guided-wave components.

Figure 6:
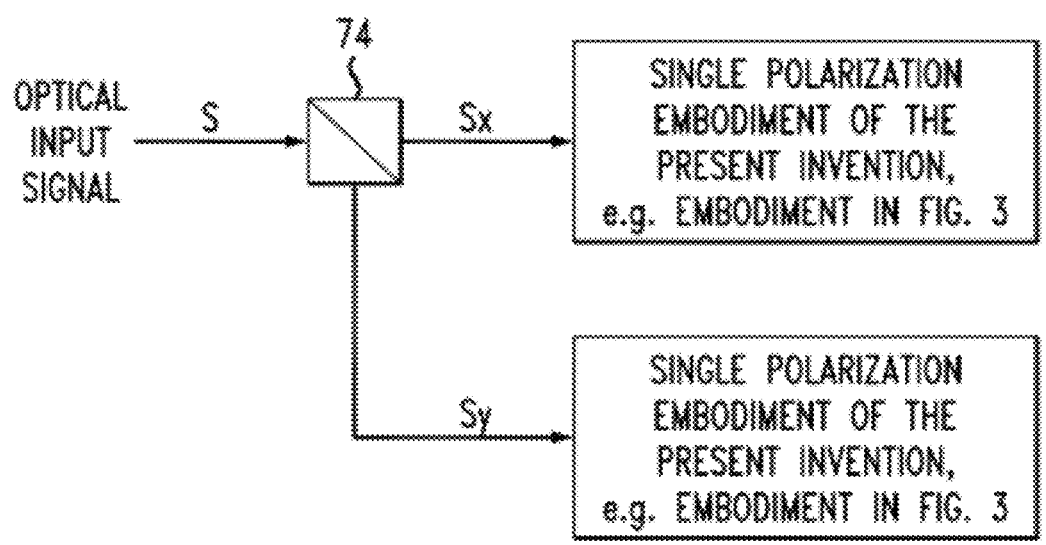
FIG. 6 illustrates a polarization-diversity arrangement of the present invention for measurement of both orthogonal states of polarization of the optical signal under test enabling measurement of polarization multiplexed signals.

The embodiment of the present invention illustrated in FIG. 3 is limited to measurement of only one polarization axis of optical input signal S. FIG. 6 illustrates an exemplary polarization diversity arrangement which may utilized in the practice of the present invention. As shown, optical input signal S (which is in general of random polarization) is first applied as an input to a polarization separation element, such as a polarization beam splitter (PBS) 74, which decomposes optical input signal S to form a pair of polarized output signals denoted $S_x$ and $S_y$. Thereafter, each of these polarized signals are separately processed through a pair of separate sampling arrangements illustrated in FIG. 3 and discussed hereinabove.

By simultaneously processing the two separate polarization field components, the functionality of polarization-independent measurements of optical input signal S can be accomplished by thereafter combining the measured field components into a replication of the original electric field of the input optical signal. In this case, the signal processing part of the invention responsible for IF recovery can be performed either on the combined measured samples from the two sampling arrangements, or in a separate fashion on each of the two sets of samples.

The recovery of the two orthogonal polarization parts of the polarization-multiplexed optical input signal can be performed in different ways. For example, for the case of an optical input signal S comprising independent, polarization-multiplexed, data-carrying signals, the input SOP of optical input signal S may be adjusted (such as by means of a polarization controller, not shown) such that the $S_x$ and $S_y$ components directly represent a pair of orthogonally-polarized data-carrying signals. In this case, IF recovery in the signal processing part of the present invention is independently performed in each of the two branches show in FIG. 6.

Alternatively, for the case where the SOP of optical input signal S is suitably adjusted, it is also possible to measure $S_x$ and $S_y$ in a single arrangement of the present invention illustrated in FIG. 3 by including (for example) an optical 2-to-1 switch after the PBS 74 to toggle between measurements of $S_x$ and $S_y$. For both of these cases, the two orthogonal polarization parts of the polarization-multiplexed optical input signal S can then be recovered and separated visualized.

However, more generally, the SOP of optical input signal S is not aligned; the two orthogonal polarization parts of the polarization-multiplexed signal are then sampled individually and in this case the recovery can be included in the signal processing part of the inventive arrangement, using the combined information of the two branches as inputs to known algorithms.

To reduce the needed hardware in the embodiment shown in FIG. 6, the LO reference laser and the optical sampling pulse source used in the embodiment as shown in FIG. 3 can be reused for measurement of both $S_x$ and $S_y$.

Other hardware reduction schemes will be apparent to a person skilled in the art. For example, one alternative embodiment utilizes coarse time gating of the optical signal before polarization beam splitter 74. The coarse time gating is responsible for extracting parts of the optical signal with durations related to the optical sampling rate and the number of samples measured for each characterization of the electric field of the optical signal. Following each extracted part of the optical signal, the optical signal must be removed with high extinction ratio for a duration related to the duration of the extracted part of the optical signal. The outputs from polarization beam splitter 74 can then, by using delay means and optical coupling means, be time-interleaved into a single sampling arrangement according to FIG. 3.

Figure 7:
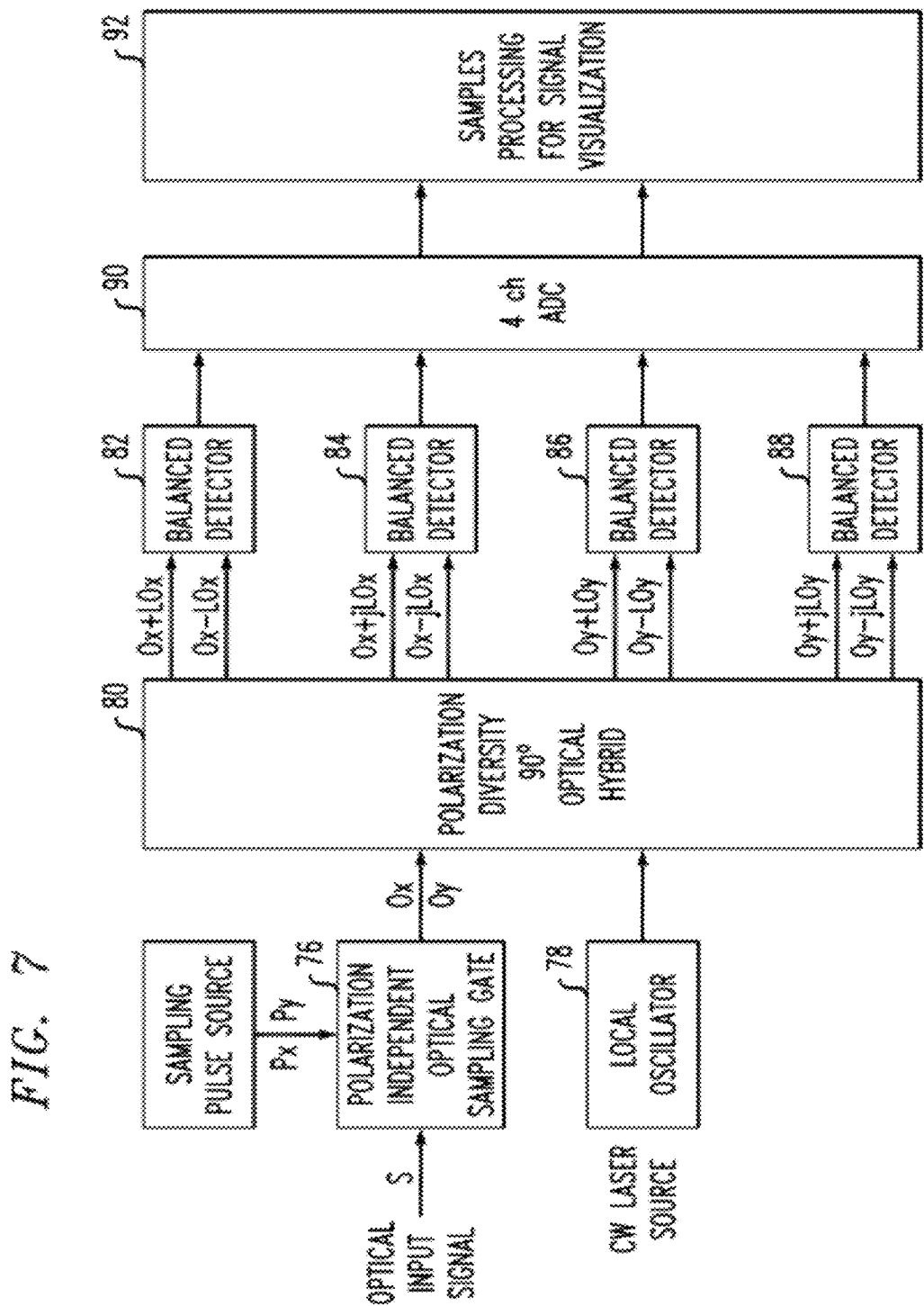
FIG. 7 shows an embodiment of the present invention with a polarization-diversity 90° optical hybrid for a polarization diversity sampling arrangement.

Polarization-diversity measurements can also be accomplished by the alternative embodiment of the present invention as illustrated in FIG. 7. In this case, the utilization of a polarization independent optical sampling gate 76 eliminates the need to align the SOP of optical input signal S with the SOP of optical sampling gate 76. In this case, two separate, orthogonally-polarized and independent sampling paths are created within the same sampling gate 76. This is accomplished by launching orthogonally polarized sampling pulse streams $P_x$ and $P_y$ through sampling gate 76, which independently opens a sampling window which is co-polarized with the SOP of the incoming sampling pulses. By virtue of using this pair of sampling pulses, a pair of orthogonal optical pulse streams $O_x$ and $O_y$ are created at the output of sampling gate 76, as shown.

The orthogonally polarized samples $O_x$ and $O_y$, proportional to orthogonally polarized components of optical input signal S, are thereafter mixed with a CW reference signal LO from a separate laser source 78 in a polarization diversity optical hybrid 80. The orthogonally polarized samples, $O_x$ and $O_y$, are mixed separately with CW reference signal LO so that the mixed terms O+LO, O−LO, O+jLO, and O−jLO for each of the orthogonal polarizations appears as individual outputs from optical hybrid 80.

In this case, the set of eight mixed output samples are presented in pairs to a group of four balanced detectors, creating a set of four electrical output signals. As shown, inputs $O_x+LO_x$ and $O_x-LO_x$ are applied as inputs to a first balanced detector 82, and inputs $O_x+jLO_x$ and $O_x-jLO_x$ are applied as inputs to a second balanced detector 84. Input mixed samples $O_y+LO_y$ and $O_y-LO_y$ are applied as inputs to a third balanced detector 86 in similar fashion, with inputs $O_y+jLO_y$ and $O_y-jLO_y$ applied as inputs to a fourth balanced detector 88. The set of four electrical signals are thereafter applied as inputs to a four-channel ADC 90 which digitizes the signals and presents them as an input to signal processor 92 which performs the desired measurements required for signal visualization.

Figure 8:
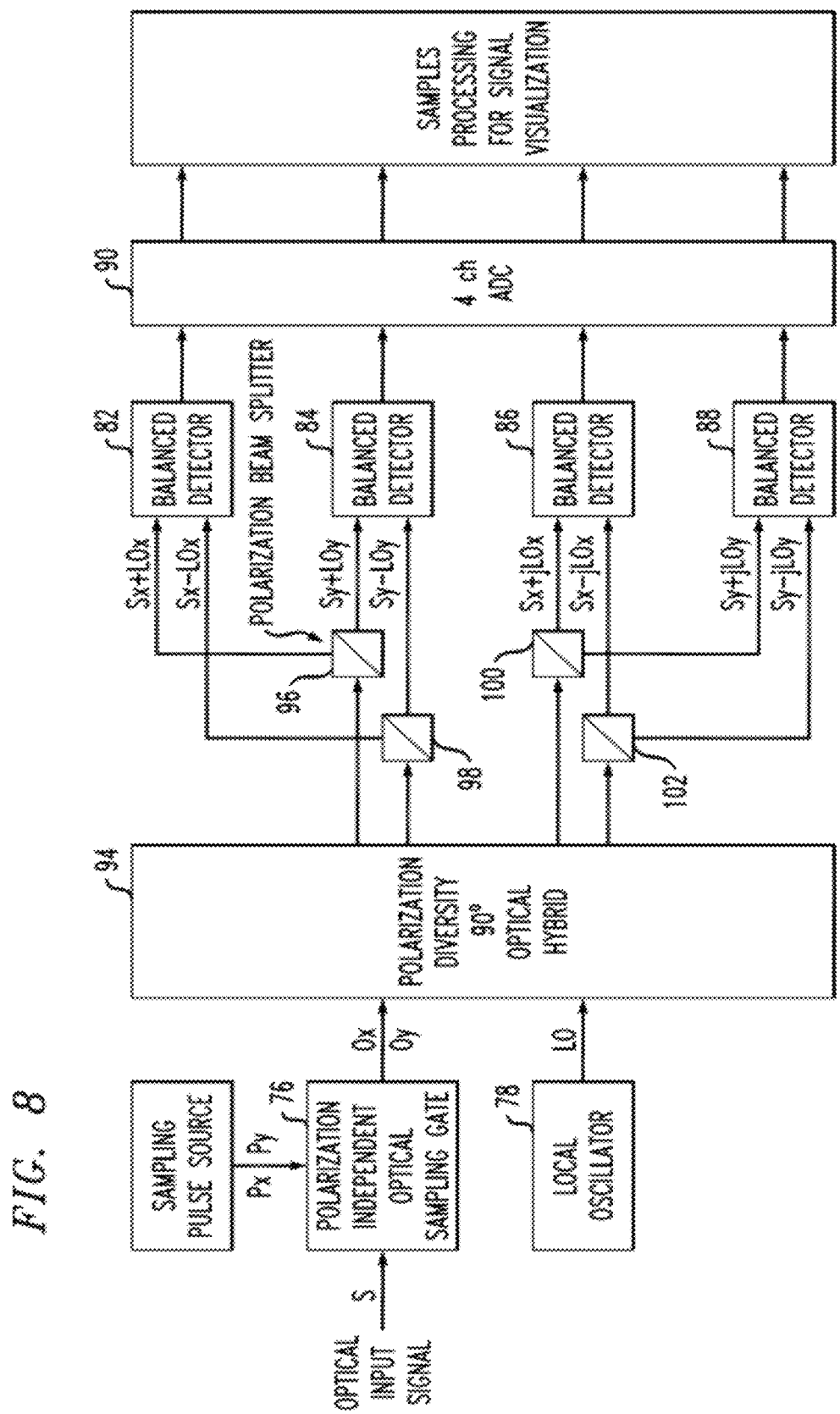
FIG. 8 shows an embodiment of the present invention with a polarization independent 90 degree optical hybrid for a polarization-diversity sampling arrangement.

An alternative configuration of the polarization-diverse arrangement of the present invention is shown in FIG. 8. In this case, the polarization diversity is accomplished by the utilization of a polarization independent optical hybrid 94 in conjunction with polarization independent optical sampling gate 76. The SOP of reference signal LO from laser source 78 should be aligned such that the field components of signal LO split equally in amplitude with respect to the SOPs of $O_x$ and $O_y$. As a result, two coherently mixed optical samples with orthogonal polarization states will be present at each output of optical hybrid 94. In this particular embodiment, the orthogonally polarized samples are thereafter separated by means of a set of polarization beam splitters 96, 98, 100, 102. As shown in FIG. 8, the outputs from PBS elements 96-102 are thereafter converted into electrical signals through the set of balanced detectors 82, 84, 86 and 88 and individually digitized within an ADC 90 in pairs corresponding to S+LO and S−LO (S+jLO and S−jLO) for each orthogonally polarized sample of optical input signal S. The signal processing part of the invention is the same as for the arrangement illustrated in FIG. 6.

Figure 9:
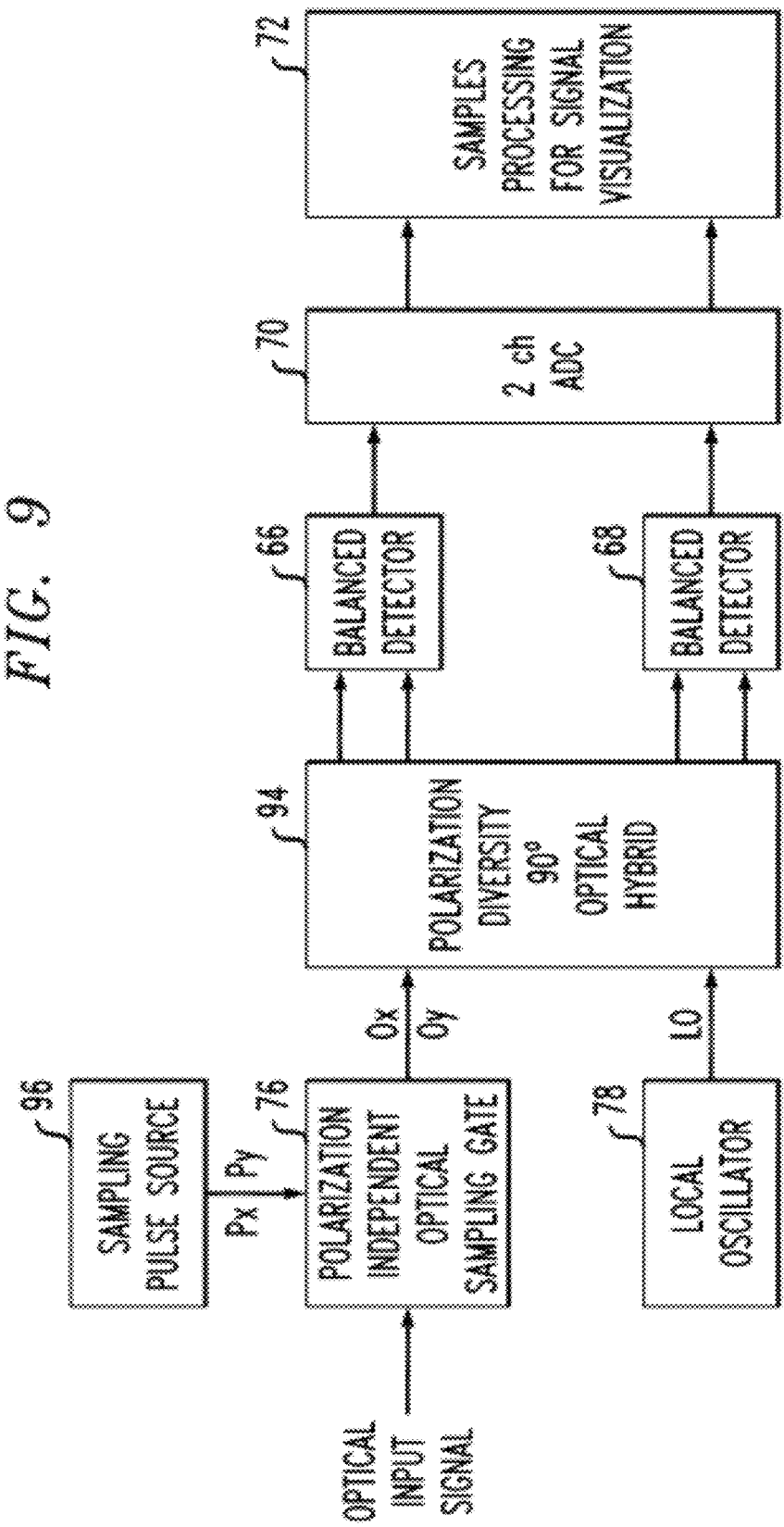
FIG. 9 illustrates a polarization independent arrangement of the present invention for measurement independent of the state of polarization (SOP) the optical input signal.

Polarization-independent measurements can be accomplished by the alternative embodiment of the present invention illustrated in FIG. 9. In contrast to the embodiment of FIG. 8, no polarization beam splitters are present at the output of polarization independent optical hybrid 94. Thus, the orthogonally-polarized, mixed samples at the outputs of polarization independent optical hybrid 94 are not separated and cannot be individually transformed into electrical signals. Instead, as shown in FIG. 9, the orthogonally polarized samples at each output are applied as inputs to the same balanced photodetector.

As long as the time offset between the orthogonally-polarized optical samples is significantly smaller than the response time of the detection means (i.e., the detector, ADC and associated detection electronics), the energy of the samples can be integrated by the detection means to provide polarization-independent measurements. This is similar to what is done in the polarization-independent intensity sampling arrangement described in U.S. Pat. No. 7,199,870, herein incorporated by reference. To obtain the accurate polarization-independent measurements, however, the orthogonally-polarized samples on each output of the hybrid should have the same phase relation to CW reference signal LO, e.g. the orthogonally-polarized samples should experience constructive (destructive) interference at the same time. Hence, the relative phase of the equal-amplitude field components from laser source 78 being mixed with the orthogonally-polarized samples $O_x$ and $O_y$ in polarization independent optical hybrid 94 has to be controlled to accomplish this. Digitizing and signal processing of the polarization-independent measurements can be performed according to previous arrangements.

It is also to be noted that if the samples can be resolved by the detection means, this same approach could be used for measurement of an optical input signal S comprising polarization-multiplexed, data-carrying signals.

In the embodiment of the present invention illustrated in FIG. 9, the relative phase requirement between the orthogonally-polarized optical samples and the orthogonally-polarized components of CW reference signal LO is met by controlling the relative phase of the two orthogonally-polarized optical samples as applied as inputs to optical hybrid 94.

In the embodiment of the present invention illustrated in FIG. 9, the relative phase requirement between the orthogonally-polarized optical samples and the orthogonally-polarized components of the LO is met by controlling the relative phase of the two orthogonally polarized sampling pulses $P_x$ and $P_y$ from sampling pulse source 96.

In the embodiment of the present invention illustrated in FIG. 9, the relative phase requirement between the orthogonally-polarized optical samples and the orthogonally-polarized components of the LO is met by controlling the input SOP of the LO into optical hybrid 94.

In order to visualize the measured electric field of optical input signal S in a way that requires timing information for each sample O (e.g., an eye-diagram or data pattern visualization), a method to obtain the time-base must be used. There are a large selection of time-base designs including hardware triggered sequential sampling techniques, software based sequential sampling techniques, and real-time sampling techniques to name a few. In general, the present invention can be implemented using many different time-base designs, as long as the sampling rate is high enough for IF recovery. New algorithms for IF recovery appear constantly, and hence a minimum sampling rate for a certain IF cannot be specified. Nevertheless, an example of such IF recovery algorithm can be found in US2006/0245766 A1. It is also to be noted that for constellation diagram visualization of the electrical field of the optical signal, no time-base is needed (since the constellation diagrams do not include timing information).

It is to be understood that other advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the claims appended hereto.

What is claimed is:

1. An optical sampling arrangement for evaluating the electrical field of a data-carrying optical input signal, the optical input signal exhibiting time-varying phase information $\phi_s(t)$, the sampling arrangement comprising a strobe source for generating a train of gating pulses;

an optical sampling element having a gating function controlled by the strobe source for transforming the optical input signal into a train of output optical sample pulses while preserving the phase information of said input optical signal;

an optical source of a continuous wave (CW) local oscillator reference signal;

an optical mixing element responsive to the train of output optical sample pulses from the optical sampling element and the local oscillator reference signal for combining said signals in a phase-diverse arrangement and generating a plurality of mixed sample composite output signals, comprising complex sums of components of said train of output optical sample pulses and said local oscillator reference signal;

an optical detector, responsive to the plurality of mixed sample composite output signals from the optical mixing element, said optical detector for processing said plurality of mixed sample output signals to remove non-mixed terms from each signal and create electrical output signals representative of the difference between pairs of mixed sample output signal; and a signal processor for digitizing the electrical output signals and extracting therefrom a sampled version of at least one sampled version of the electrical field of the optical input signal.

2. An optical sampling arrangement as defined in claim 1 wherein the strobe source generates output pulses at a predetermined repetition rate.

3. An optical sampling arrangement as defined in claim 2 wherein the predetermined repetition rate is a constant value.

4. An optical sampling arrangement as defined in claim 1 wherein the strobe source generates optical output pulses.

5. An optical sampling arrangement as defined in claim 1 wherein the strobe source generates electrical output pulses.

6. An optical sampling arrangement as defined in claim 1 wherein the optical sampling element comprises an electro-absorption component.

7. An optical sampling arrangement as defined in claim 1 wherein the optical sampling element comprises a saturable absorbing component.

8. An optical sampling arrangement as defined in claim 1 wherein the optical sampling element comprises an optical nonlinear sampling component.

9. An optical sampling arrangement as defined in claim 8 wherein the optical nonlinear sampling component performs four-wave mixing between the optical input signal and the train of gating pulses.

10. An optical sampling arrangement as defined in claim 9 wherein the optical nonlinear sampling component comprises a section of highly-nonlinear optical fiber.

11. An optical sampling arrangement as defined in claim 1 wherein the phase-diverse mixing element comprises an optical hybrid.

12. An optical sampling arrangement as defined in claim 11 wherein the optical hybrid creates a $\pi/2$ phase shift between each of the plurality of mixed sample output signals and is referred to as a 90° optical hybrid.

13. An optical sampling arrangement as defined in claim 1 wherein the optical detector comprises a pair of balanced optical detection devices, each for receiving a separate pair of inputs from the plurality of mixed sample output signals.

14. An optical sampling arrangement as defined in claim 1 wherein the optical detector comprises a plurality of optical detection devices, each for receiving a separate one of the plurality of mixed sample output signals from the optical mixing element.

15. An optical sampling arrangement as defined in claim 1 wherein the arrangement further comprises an optical filtering element disposed between the output of the optical sampling element and the input of the optical mixing element, the optical filtering element for passing only mixed sample output signals at a predetermined sampling wavelength.

16. An optical sampling arrangement as defined in claim 1 wherein the sampling arrangement is polarization independent and further comprises:
  a polarized strobe source for generating a pair of orthogonally polarized trains of gating pulses; and
  a polarization-independent optical sampling gate, responsive to the pair of orthogonally polarized trains of gating pulses and the optical input signal S, the polarization-independent optical sampling gate providing a pair of orthogonal signal paths therethrough such that each train of gating pulses propagates along a separate one of the pair of orthogonal signal paths.

17. An optical sampling arrangement as defined in claim 16 wherein the arrangement further comprises
  a polarization-diversity optical hybrid, responsive to the plurality of orthogonally-polarized output signals from the polarization-independent optical sampling gate and generating a first plurality of mixed sample output signals and a second plurality of mixed sample output signals, the second plurality of mixed sample output signals being orthogonally-polarized with respect to the first plurality of mixed sample output signals.

18. An optical sampling arrangement as defined in claim 16 wherein the arrangement further comprises
  a polarization-independent optical hybrid, responsive to the plurality of orthogonally polarized output signals from the polarization independent optical sampling gate and generating a plurality of mixed sample output signals, each signal comprising a pair of orthogonally polarized components; and
  a plurality of polarization beam splitters for receiving each of the mixed sample output signals and coupling each of the separate orthogonally polarized components onto a separate output signal path.

19. A method for measuring the representation of the electrical field of an optical input signal, the optical input signal exhibiting time-dependent phase information $\phi_s(t)$ and the method comprising the steps of:
  sampling the optical input signal in a nonlinear process controlled by a gating signal to create a train of output optical sample pulses that preserve the phase information of said input optical signal;
  optically mixing the train of output optical sample pulses with an optical reference signal and generating a plurality of mixed sample output signals, each mixed sample output signal comprising complex sums of components of said train of output optical sample pulses and the optical reference signal;
  converting the plurality of mixed sample output signals into an electrical representation using balanced optical detection to remove non-mixed terms from each signal and creating electrical output signals representative of the difference between each pair of mixed sample output signal; and
  digitizing and processing the electrical output signals to extract therefrom a sampled version of the electrical field and phase information of at least one sampled version of the electrical field of the optical input signal.

* * * * *